US006877723B2

(12) United States Patent
Martinsson et al.

(10) Patent No.: US 6,877,723 B2
(45) Date of Patent: Apr. 12, 2005

(54) VALVE FOR CONTROL OF ADDITIONAL AIR FOR A TWO-STROKE ENGINE

(75) Inventors: Pär Martinsson, Jönköping (SE); Mikael Bergman, Huskvarna (SE); Bo Carlsson, Floda (SE); Mats Roberg, Huskvarna (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 10/064,320

(22) Filed: Jul. 2, 2002

(65) Prior Publication Data

US 2003/0011081 A1 Jan. 16, 2003

Related U.S. Application Data

(63) Continuation-in-part of application No. PCT/SE00/02463, filed on Dec. 22, 2000.

(30) Foreign Application Priority Data

Jan. 14, 2000 (SE) .............................................. 0000095

(51) Int. Cl.$^7$ .............................................. F02M 17/40
(52) U.S. Cl. ................ 261/23.3; 123/73 R; 123/73 PP; 261/46; 261/55; 261/63; 261/DIG. 1
(58) Field of Search ........................... 261/23.3, 46, 55, 261/63, DIG. 1; 123/73 R, 73 PP

(56) References Cited

U.S. PATENT DOCUMENTS

| 968,200 A | 8/1910 | Scott |
| 980,134 A | 12/1910 | Springer |
| 1,113,456 A | 10/1914 | McIntosh |
| 1,121,584 A | 12/1914 | Harper, Jr. |

(Continued)

FOREIGN PATENT DOCUMENTS

| AT | 394755 B | 11/1991 |
| DE | 420100 | 10/1925 |

(Continued)

OTHER PUBLICATIONS

F. W. Lanchester and R. H. Pearsall, The Institution of Automobile Engineers. An Investigation Of Certain Aspects Of The Two–Stroke Engine For Automobile Vehicles, Feb. 1922, pp. 55–62, The Automobile Engineer.

(Continued)

Primary Examiner—Richard L. Chiesa
(74) Attorney, Agent, or Firm—Novak, Druce & Quigg, LLP

(57) ABSTRACT

Flange assembly for supporting a structure that provides scavenging air supply to an internal combustion engine at the carburetor to the engine. The assembly includes a thin-body flange that is configured to be abuttingly installed upon an end surface of the carburetor. The carburetor has its combustion air intake or port exposed at an outer surface for intaking air for the combustion process. The thin construction of the flange enables advantageous positioning of the adaptive flange. The relative dimensioning of the thin-body flange also contributes to its low-impact as a modification to air inlet arrangement. A combustion air aperture is provided that extends through the thin-body flange. The combustion air aperture is located in the flange for alignment with the combustion air intake. By this alignment, fluid communication is established across the flange and into the carburetor when the flange is abuttingly installed upon the carburetor. A scavenging air aperture also extends through the thin-body flange and is spaced apart from the combustion air aperture. A valve assembly is operatively coupled to the thin-body flange and has a valve element positioned at the scavenging air aperture for opening and closing the scavenging air aperture.

39 Claims, 12 Drawing Sheets

U.S. PATENT DOCUMENTS

| | | | |
|---|---|---|---|
| 2,317,772 A | | 4/1943 | Huber et al. |
| 2,377,852 A | * | 6/1945 | Bliffert ............... 48/189.3 |
| 2,642,089 A | * | 6/1953 | Christie ............... 251/145 |
| 4,067,302 A | | 1/1978 | Ehrlich |
| 4,075,985 A | | 2/1978 | Iwai ............... 123/73 A |
| 4,083,342 A | * | 4/1978 | Bertling ............... 123/700 |
| 4,176,631 A | | 12/1979 | Kanao |
| 4,248,185 A | | 2/1981 | Jaulmes |
| 4,253,433 A | | 3/1981 | Blair |
| 4,306,522 A | | 12/1981 | Fotsch |
| 4,340,016 A | | 7/1982 | Ehrlich |
| 4,481,910 A | | 11/1984 | Sheaffer |
| 4,969,425 A | | 11/1990 | Slee |
| 4,987,864 A | | 1/1991 | Cantrell et al. |
| 5,379,732 A | | 1/1995 | Mavinahally et al. |
| 5,417,894 A | * | 5/1995 | Witte, Sr. ............... 261/23.1 |
| 5,425,346 A | | 6/1995 | Mavinahally |
| 5,645,026 A | | 7/1997 | Schlessmann |
| 5,857,450 A | | 1/1999 | Staerzl |
| 6,016,776 A | | 1/2000 | Jonsson |
| 6,085,703 A | | 7/2000 | Noguchi |
| 6,112,708 A | | 9/2000 | Sawada et al. |
| 6,216,650 B1 | | 4/2001 | Noguchi |
| 6,240,886 B1 | | 6/2001 | Noguchi |
| 6,289,856 B1 | | 9/2001 | Noguchi |
| 6,328,288 B1 | * | 12/2001 | Gerhardy ............... 261/35 |
| 6,334,606 B1 | * | 1/2002 | Tobinai et al. ............... 261/23.3 |

FOREIGN PATENT DOCUMENTS

| | | | |
|---|---|---|---|
| DE | 470603 | | 1/1929 |
| DE | 748415 | | 11/1944 |
| DE | 749456 | | 11/1944 |
| DE | 2151941 | | 4/1973 |
| DE | 2650834 | | 6/1977 |
| DE | 3329791 | A1 | 2/1985 |
| DE | 3722424 | A1 | 1/1988 |
| DE | 19857738 | A1 | 7/1999 |
| EP | 0337768 | A2 | 10/1989 |
| EP | 0391793 | A1 | 10/1990 |
| EP | 0971110 | A1 | 1/2000 |
| EP | 0997620 | A2 | 5/2000 |
| FR | 784866 | | 7/1935 |
| FR | 1434710 | | 2/1966 |
| GB | 2022699 | A | 12/1979 |
| GB | 2130642 | A | 6/1984 |
| JP | 57-32044 | * | 2/1982 ............... 261/23.3 |
| JP | 57-183520 | A | 11/1982 |
| JP | 56102519 | | 1/1983 |
| JP | 58-005423 | | 1/1983 |
| JP | 07269356 | | 10/1995 |
| JP | 09-268917 | | 10/1997 |
| JP | 2000170611 | | 6/2000 |
| JP | 2000328945 | | 11/2000 |
| JP | 2000337154 | | 12/2000 |
| WO | WO 8902031 | A1 | 3/1989 |
| WO | WO 98 57053 | A1 | 12/1998 |
| WO | WO 00 65209 | A1 | 11/2000 |
| WO | WO 00 43650 | A1 | 12/2000 |
| WO | WO 01 25604 | A1 | 4/2001 |
| WO | WO 01 44634 | A1 | 6/2001 |

OTHER PUBLICATIONS

Dr.–Ing. Kurt Blume, Gaissach, Zweitakt–Gemischspülung mit Spülvorlage, 1972, pp. 475–479, DK 621.43–144.4. 058.2, Motortechnische Zeitschrift 74 (1972) 12.

Prof.Dr.H.P.Lenz, Dipl.Ing.G.Bruner, Dipl.Ing. F. Gerstl, Abschlussbericht, zum Forschungsauftrag sur Entwicklung eines Ladungswechselverfahrens mit Spülvorlage Für Motorfahrräder, Mar. 1978, pp. 1–16, Tables I–III, Bild 1–17, Z–NR. B0644, Institut Für Verbrennungskraftmaschinen und Kraftfahrewsen. Technische Universität Wien.

Dipl.–Ing. Friedrich Gerstl, Dissertation, Massnahmen zur Abgas—und Verbrauchsverbesserung Von Kleimvolumigen Zweitakt—Ottomotoren, ausgefuhrt sum Zwecke, der Erlangung des akademischen Grades eines Doktors der technischen Wissenschaften, eingereicht an der Technischen Universitat in Wein, Aug. 1979.

J. Meyer, Air–Head Charge Stratification Of A Two–Stroke Outboard Engine, Mar. 1992, The Queen's University of Belfast, School of Mechanical & Manufacturing Engineering.

Dr. R. Pischinger, 5$^{th}$ Graz Two–Wheeler Symposium, Apr. 22–23, 1993, Heft 65, Technische Universitat Graz, Mitteilungen des Institutes fur Verbrennungskraftmaschinen und Thermodynamik, Belfast, Ireland.

* cited by examiner

VALVE FOR CONTROL OF ADDITIONAL AIR FOR A TWO-STROKE ENGINE

CROSS REFERENCE TO RELATED APPLICATIONS

The present application is a continuation-in-part of PCT/SE00/02643, filed Dec. 22, 2000 and published in English pursuant to PCT Article 21(2), and which claims priority to Swedish Application No. 0000095-0 filed 14 Jan. 2000. Both applications are expressly incorporated herein by reference in their entireties.

BACKGROUND OF INVENTION

1. Technical Field

The subject invention(s) are related to arrangements for facilitating the provision and control of additional air, also referred to as scavenging air, to a two-stroke internal combustion engine; more particularly, the invention(s) are directed toward an adaptive thin-body flange, also referred to as a scavenging air transfer member, that is mountable to the engine's carburetor for facilitating the provision of scavenging air to the engine, as well as providing a control valve assembly that regulates the flow of such scavenging air during the engine's operation.

2. State of the Art

Regarding internal combustion engines, and particularly two-stroke engines, increased emphasis is continually being placed on the reduction of fuel consumption and the achievement of cleaner exhaust gases. Two-stroke internal combustion engines have typically been designed with special flow ducts through which fresh air is introduced into the combustion chamber ahead of the air-fuel mixture. In such a scavenging procedure, at the end of the engine power stroke, when the port of the exhaust duct is opened, fresh air is supplied behind the exhaust gases and before the fuel/air mixture. This supply of additional air to the combustion chamber is also called scavenging air. In an ideal state, all of the exhaust gases are pushed out, and this scavenging air acts as a buffer ahead of the air-fuel mixture subsequently coming into the chamber from the engine crankcase. In this buffering capacity, the additional air reaches the exhaust port before it is completely closed by the upward moving piston during the following compression stroke.

What has been described so far are the conditions existing for a two-stroke engine at operational speed. Under these conditions of higher speed engine operation, the percentage amount of additional air is less critical. A problem can arise and become acute, however, when the engine is running at idle speed. In order to keep this idle speed as low as possible, the carburetor is adjusted, typically via adjuster screws, to assure a proper fuel/air mixture for the idling operational speed. This means that the air and fuel must be appropriately metered and allowed to be drawn in by the movement of the piston at proportions that just allow the engine to continue to run smoothly without any risk of stopping unwarrantably. In this low-speed operational range, additional air should not be allowed to enter into the engine, since small variations in the supply of air results in too lean of an air-fuel mixture.

Known valve arrangements for controlling the supply of additional or scavenging air suffer a number of disadvantages. Such valves have typically been of either the barrel or butterfly type, the latter also being oftentimes referred to as a rosette valve. Both types of valves have traditionally been located in the scavenging air duct, and because the inlet to the duct is downstream of the intake muffler, turbulent air flow is experienced in the duct which complicates the control of the proportion of additional air supplied.

When it comes to comparatively small engines for portable working tools, the exactness of such valves is important to achieve sufficiently precise control of the amount of scavenging air. Structurally, these needs for such precision are quite opposite to the design criteria of the balance of such small engines where the demand is for a rugged tool that can be used in a climatologically tough and/or dusty environment. Although the scavenging air traversing such valves has normally been filtered, some smaller particles cannot be separated out and do reach the valves.

Since the valve assemblies of the barrel type have relatively large sealing areas, a small amount of particulate can cause a deficient control function of the valve thus resulting in irregular engine speed and operation. Still further, those abrasive particles that are not filtered out of the scavenging air stream can become stuck to the sealing areas and cause wear to the associated valve components resulting in deterioration of their sealing ability, even after cleaning if damage is done to the exposed surfaces of the components.

In a damp and cold environment, freezing can occur in these valves due to their large sealing areas. The butterfly valve provides widely varying degrees of leakage at closing depending on how rapidly it is being closed. The closing of this type of valve also very much affected by dirt.

Another common reason for air leakage about valve assemblies typically used in such applications is that metal-to-metal contact is usually depended upon for achieving the seal. Because of the hardness of the abutting metal components of conventional valve designs, inexact mating between these components will result in leakage to varying degrees. It has been further recognized as an advantage and purpose of the presently disclosed invention(s) to reduce or alleviate such leakage.

Regarding the ever increasing stringency for improved fuel consumption and emission's quality outlined above with respect to internal combustion engines, as well as the desire to continually increase such engines performance characteristics, designs are frequently changing. These changes can be to the engine itself, and/or the carburetor that is associated therewith. In the case of two-stroke engines, however, the necessity for providing a scavenging air supply does not change. Therefore, there is a constant design criteria for mating such an additional air supply to the engine arrangement, regardless of its design. Heretofore, accommodation of the scavenging air supply has in some instances been incorporated via modification to the carburetor's design; typically at substantial detriment to a new engine's design program with respect to both time delays and increased costs.

The utilization of connective adaptors for facilitating the support of scavenging air assemblies is known. A review of these assemblies, however, reveals certain deficiencies. One example includes the abrupt turning of the flow path of the scavenging air at the adapter. An illustration of such a characteristic may be appreciated from the drawings of JP-9-268917 in which scavenging air enters the adapter (8) flowing generally in a horizontal direction and is abruptly turned ninety degrees to flow further through the scavenging air channel or duct. Necessarily, the scavenging air flow is once again turned ninety degrees at the elbow (6) to flow toward the two-stroke internal combustion engine being supplied the scavenging air. It should be appreciated that each turn in the scavenging air flow path has a resistive effect on the air flow therethrough. Moreover, a series of turns in the flow channel has a cumulative detrimental effect that significantly deteriorates flow efficiency through the channel.

It is for these reasons, as well as others revealed through the study of scavenging air arrangements for two-stroke internal combustion engines, that the present invention(s) have been developed for at least the purposes of providing inexpensive and easy to use scavenging air support adapters whose designs can be readily modified to accommodate different engine configurations, as well as changes in any particular engine design.

SUMMARY OF INVENTION

In a broad sense, the present invention(s) takes the form of a connective adapter utilized to accommodate the incorporation of a scavenging air supply to a two-stroke internal combustion engine. In one configuration, the adapter takes the form of a thin-body flange that is connected upon the carburetor to such an engine. As intimated above, an important design criteria for such an adapter is that it can easily be modified for use on different engine configurations. Similarly, it must be able to be quickly modified to accommodate design changes in the course of the development of a particular engine involved in a new design, or redesign program. The present invention, in at least one embodiment, accomplishes this through thin-body flange-type construction of the connective adaptor. This type of construction is not only easily modified during the design phase or prototyping of an engine, but the simple and elegant construction further facilitates mass production. The inexpensive construction of such a flange, also referred to as a scavenging air transfer member, is also important to the overall economics of an engine's design. Not only is the flange itself economical to manufacture, but it's utilization replaces what would otherwise be extensive redesign to the carburetor itself which is both more costly and time-consuming.

Another beneficial aspect of the flange-type design is its capability for being monolithically manufactured; that is, being off one-piece construction. The one-piece adapter is intended to be preferably mounted directly to the carburetor. In this configuration, the one-piece construction, normally from metal, or similar durable and rigid material, enables precision-placement with respect to relative location of portions of the flange with respect to the carburetor, and the ancillary functioning components associated therewith. For instance, it is contemplated that the same fasteners, typically bolts or screws, used to assemble the carburetor can also serve to fix the scavenging air transfer member to the carburetor. One beneficial feature of this construction and assembly is the precision location of the scavenging air aperture or channel with respect to the carburetor. Such precision becomes even more important when the interconnecting of functional components is considered. Exemplarily, the valve located at the additional or scavenging air duct or channel must be precisely controlled via a linkage to an actuator operating from the carburetor. If the relative positioning of the several components involved in this assembly are not accurate with respect to one another, the provision of scavenging air to the engine will be hampered. The one-piece construction of the transfer member, however, contributes to ensuring that the relative location of components incorporated upon the transfer member are nearly exact with respect to the carburetor upon which it is mounted. Still further, the monolithic construction positively contributes to high quality control by eliminating possible deviations that can occur in similar assemblies composed of a plurality of parts that can become offset one from the others during assembly and operation.

In at least one embodiment, the scavenging air flange or transfer member is constructed to be predominantly flat and rigid, but contemplates slight variations and accommodations to the basic planar structure. As an example, the primarily flat flange may advantageously be composed of two slightly offset planar portions connected by a transitional portion therebetween. A benefit of this construction is that the transfer member can be constructed from metal, or similar material sheeting. In the instances where the scavenging air transfer member is substantially flat in construction, and the scavenging air transfer channel takes the form of an aperture through the transfer member, punch and stamp manufacturing methods may be exclusively and advantageously utilized.

Downstream and toward the engine from the scavenging air inlet port at the transfer member, the scavenging air flow may advantageously be divided into a plurality of flows through separated channels via a distributing multi-branch manifold. In this configuration, the additional air duct or scavenging air transfer channel, which can take the form of an aperture through the transfer member, can advantageously be oblong in shape. With the long dimension of the oblong opening arranged substantially in parallel with a series of branch openings provided downstream therefrom by the manifold, efficient flow patterns begin to be established early in the scavenging air transfer channel created within the transfer member that facilitate distribution via the manifold with a minimized flow turbulence induced therein.

As earlier described, a control valve assembly is typically associated with the scavenging air transfer channel for opening and closing the flow path. Even though at least one embodiment of the transfer member takes the form of a thin-body flange, sufficient fortitude is provided in the construction of the transfer member to accommodate the inclusion of such a valve assembly. The valve member, as a component of the valve assembly, can be mounted either on an external surface of the transfer member, or it can be internally mounted within a body of the transfer member. For this reason, the valve element is described and claimed as being positioned at the transfer channel or scavenging air aperture, and this terminology is intended to encompass both mounting situations for the valve element. Similarly, most valve elements are in some way carried on an axle for either pivotal or rotational operation between open and closed configurations. Therefore, in the context of the present invention(s), the axle for the valve element has been similarly recited.

As intimated above, the course of the scavenging air's flow path is important to the efficient delivery of additional air to the two-stroke internal combustion engine. A goal is to keep the delivery path as straight as possible along as much of the path as possible. In association with the present invention(s), this configuration, at least through the scavenging air transfer member, has been characterized in terms of the orientation of a longitudinal axis of the scavenging air aperture or channel. In at least one embodiment in which the thin-body flange is intended to be substantially vertically mounted upon an end of the carburetor, the longitudinal axis of the scavenging air channel is defined as being substantially perpendicular, or horizontal to the longitudinal axis of the flange.

In one embodiment, the scavenging air transfer member or flange is designed to be installed on an end of the carburetor positioned away from the internal combustion engine. Typically, and as shown with respect to several of the embodiments of the invention, this end of the carburetor oftentimes also includes the inlet port for the combustion air that is mixed with fuel at the carburetor. In one configuration, a second aperture is provided through the transfer member to be placed over the primary or combustion air inlet so as to avoid blockage of that inlet. For increased strength and rigidity when incorporated upon the carburetor, the transfer member or flange is advantageously configured in this embodiment to cover substantially the entirety of this air inlet end of the carburetor, as well as be abuttingly mounted thereupon in face-to-face engagement therewith. From this, it should be apparent that the present invention(s) contemplate a scavenging air transfer member, optionally in the form of a thin-body flange, that does not cover the entirety of the surface of the carburetor upon which it is mounted. Still further, it is not necessary that the second aperture for the combustion air inlet be provided in the flange if that inlet would not otherwise be covered by the flange when installed thereupon. More specifically, such an embodiment of the invention could be considered to take the form of a half-flange, or some other configuration that covers only a portion of the surface of the carburetor upon which the scavenging air transfer member is mounted.

To address the sealing deficiencies described above when substantially rigid and non-yielding materials are utilized in incorporated valve assemblies, the present invention(s) contemplate the utilization of buffering-type material(s) at the interface between abutting components of the valve assembly intended to establish a substantially airtight seal. This is accomplished by assuring that one of the abutting surfaces presents a softer or buffering material, when compared to that which it engages, that yields slightly to the harder material thereby forming a more complete seal therewith. Interstitially located components may be used for this purpose such as a lip about a perimeter of the valve member, or a passage liner in the form of a receiving ring or bushing located at or in the body of the valve and against which the valve member engages. Alternatively, one of the abutting components can be constructed from a material that is slightly yielding to the other construction material of the engaged component.

In at least one embodiment, the present invention takes the form of a flange assembly for supporting a structure that provides a scavenging air supply to an internal combustion engine at a carburetor associated with the particular engine. The flange assembly includes a thin-body flange that is configured to be abuttingly installed upon an end surface of such a receiving carburetor. In the invention, the associated carburetor is characterized as "receiving" since the thin-body flange is typically mounted or received thereupon. A suitable carburetor necessarily has its combustion air intake or port exposed at an outer surface for intaking air for the combustion process. The end positioning of the flange should be contrasted to either the top, bottom or lateral sides of the carburetor. Because of the thin construction of the flange, the advantageous positioning of this adaptor is made possible. Previously, end mounts on carburetor's have been taught away from because of their detrimental lengthening of the carburetor assembly; normally by causing the air filter arrangement to be spaced further apart from the main body of the carburetor. In at least one embodiment, the relative dimensioning of the thin-body flange that enables this utilization is specified. A combustion air aperture is provided that extends through the thin-body flange. The combustion air aperture is located in the flange for alignment with the combustion air intake. By this alignment, fluid communication is established across the flange and into the carburetor when the flange is abuttingly installed upon the carburetor. A scavenging air aperture also extends through the thin-body flange and is spaced apart from the combustion air aperture. A valve assembly is operatively coupled to the thin-body flange and has a valve element positioned at the scavenging air aperture for opening and closing the scavenging air aperture.

An important consideration to all carburetor manufactures is compactness. The low-impact that the inclusion of the thin-body flange of the present invention has on the overall length of the carburetor assembly is not only attributable to the thin construction of the body. The impact of the addition of the instant adaptive flange is minimized by its flat, planar construction, as well as the one-above-the-other arrangement of the scavenging air aperture and the combustion air apertures through the flange. Still further, the straight flow of air across the flange through both apertures, orifices that are preferably oriented substantially parallel to one another, prevents restrictions or changes in the air flow patterns at the carburetor. This is due not only to the relatively short passage across the flange, but also to the in-line, and aligned positions and orientations of the apertures. This is important in avoiding ill-effects or detriment to the original design and performance of the receiving carburetor.

In a preferred embodiment, the thin-body flange is of one-piece construction; that is, the flange body is unitary. Still further, the body of the flange is substantially flat in shape. Because of the flange's unitary construction from rigid material, precision-location of the scavenging air aperture relative to the combustion air aperture is established. An added benefit of this unitary construction is the facilitation of precision-placement of the scavenging air aperture with respect to the receiving carburetor when the thin-body flange is installed thereupon.

As illustrated, fastener accommodating apertures extend through the thin-body flange and are located to be aligned with assembly screw receivers in the receiving carburetor when the flange is installed or mounted thereupon. The rigid, non-yielding construction of the unitary flange also permits precision-placement of the scavenging air aperture with respect to the receiving carburetor. This feature is important because of dimensionally exact operative linkages that must be established between moving components on the flange and others on the carburetor assembly. Typically, the fasteners are bolts or screws, or similar fastening members. It is also contemplated that the fastener accommodating apertures may take the form of elongate slots, or otherwise modified voids through the flange that permit adjustment between the flange and the carburetor.

As shown, these fastener accommodating apertures are aligned with assembly screw receivers in the carburetor when the thin-body flange is properly positioned thereupon. This permits simplicity and uniformity in construction and assembly. Alternatively, however, the apertures in the flange may be offset from the assembly holes in the carburetor thereby necessitating the drilling and tapping of additional receivers in the carburetor. While less elegant from a manufacturing and assembly point of view, this arrangement allows custom and precision positioning of the flange and associated components relative to the carburetor.

The valve that controls the air flow through the scavenging air aperture may be of any suitable design; illustrated examples include the flapper-type valve and the butterfly-type valve configurations. An important design feature, however, is that a predominance of the valve assembly be carried in or on the thin-body flange. In this way, the flange assembly can be added essentially as an accommodating unit either prior to the carburetor's incorporation on an engine, or afterwards. Still further, each of the valve types typically have an axle upon which a valve element is carried for either pivotation or rotation. Advantageously, this axle can be placed at the scavenging air aperture; that is, in close proximity thereto. This is particularly true of the butterfly valve whose axle extends across the scavenging air aperture and the valve element is positioned within an interior space inside the flange created by the scavenging air aperture, itself.

In another aspect, the invention includes the provision of a buffering component positioned between the valve element that is associated with the scavenging air aperture and the thin-body flange when the valve is in a closed configuration. The buffering component is constructed from material that is softer than the material that is used in the construction of the valve element and/or the portion of the flange upon which the valve element seats in its closed configuration. Exemplarily, the buffering material can be a polymer, while the flange and valve element are constructed from metal.

In another embodiment, the invention takes the form of an inlet unit to a two-stroke internal combustion engine having a special flow duct in addition to the primary air duct. This additional air supply is arranged and intended for additional air to help the scavenging of the combustion chamber. The inlet of this flow duct is provided with a flap valve, preferably in abutment against a lip-shaped seal made of a compliant material and circumscribing the inlet opening. The valve plate is pivotably mounted to a shaft, located either in close proximity outside the inlet opening, or, at a distance therefrom. In the latter case, the valve plate is mounted to a distancing or extension device exemplarily in the form of a pair of shanks that turn round the turning shaft.

The turning of the air-regulating valve takes place in synchronism with the turning of the throttle valve, a lever being connected, in a determined angle, with the turning shaft of the valve. A link rod is connected to this lever and the rod's other end is pivotably mounted to a second lever fixed to the turning shaft of the additional air-regulating valve, at a determined angle.

The angular position of the levers in relation to the turning shaft of each valve are each preselected and established. The angle is selected so that when the throttle valve is in the idling position, the additional air-regulating valve is completely closed. Then, when the engine speed is increasing as the throttle's movement rotates the turning shaft of the throttle valve, the additional air-regulating valve will first be opened slowly, thereafter proportionally more rapidly. Advantageously, this may be accomplished via the utilization of a variably configured cam member.

In order to secure the air-regulating valve's airtight blockage of the inlet of the additional air duct, which continues as air ducts, the valve is preferably spring-loaded.

The invention accommodates essentially any cross-sectional shape of the additional air duct. This is an advantage for very small engines; and by having, for example, an oval cross-section at the inlet of the duct, the transition into two or more branches is simplified wherein each such branch is connected to a cylinder of the engine.

In at least one embodiment of the invention, the lever on the turning shaft of the throttle valve is replaced by an eccentrically mounted cam surface or camshaft pulley, and the link rod by a push rod connected with the turning shaft of the valve of the additional air duct via a valve supporting device. This can be spring-loaded for sealed contact of the valve plate against its seat when not actuated.

By these several embodiments, certain inventive features have been evidenced regarding the provision of scavenging air to two-stroke internal combustion engines.

Examples of how these features may be realized are addressed in the description immediately following.

DETAILED DESCRIPTION

Figure 1:
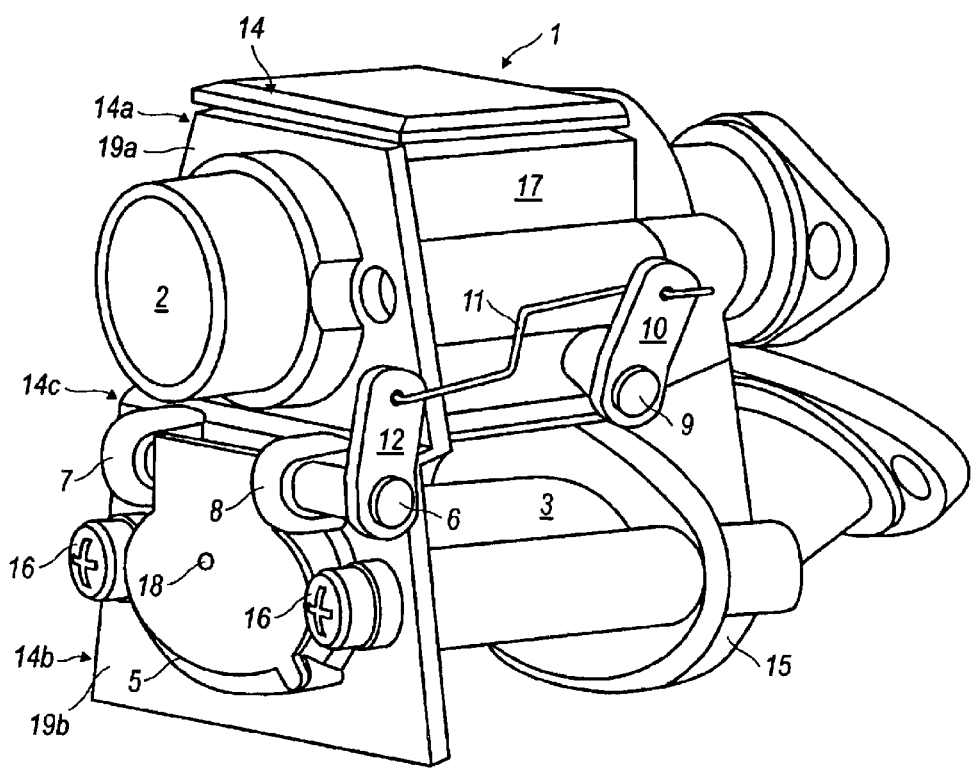
FIG. 1 is a perspective view of one embodiment of the present invention including an exemplary flange incorporated upon an intake unit at an inlet side thereof, with an additional air duct being provided with a valve and located below the primary air duct; adjuster screws for regulating fuel and combustion air are all conventional and therefore not shown.

Several new concepts and inventive arrangements are presented herein that are associated with improved designs for two-stroke internal combustion engines. In the accompanying figures, an important aspect of the several disclosed invention(s) is presented as a scavenging air transfer member that is illustrated as a thin-body flange. In the several figures, the scavenging air transfer member, or flange, is depicted in varying degrees of assemblage with the components to which it is intended to be mounted. In general, it should be appreciated that the scavenging air transfer member, also referred to herein as a thin-body flange, and alternatively as a connective adapter 14, 58 is a primary component being presently protected. A primary purpose of the scavenging air transfer member is to facilitate the provision of additional or scavenging air, via an associated duct 3,54, to the engine 40 for the purposes described hereinabove.

To help establish the environment within which the scavenging air transfer member is utilized, associated components and structure are recited and described, including a receiving carburetor 17,42 that is designed to provide a fuel/air mixture a two-stroke internal combustion engine 40. Therefore, it should be appreciated that even though the associated components, such as the carburetor 42 and engine 40, may be referred to in the appended claims for purposes of establishing environment for comparative reference with respect to certain aspects of the claimed transfer member 14,58 itself, the claims should not be interpreted as requiring these associated structural components to be actually present when those claims are being interpreted, unless such inclusion is expressly indicated. More specifically, applicant(s) have taken care to distinguish those aspects which are required limitations of a particular claim by designating the particular element using the term "said" subsequent to the element's original introduction. When considering the claims in view of the disclosure of the present specification in its entirety, including the appended drawings, an evaluator will have no difficulty assessing claimed aspects defined relative to these environment-setting aspects, even though the later aspects are not required to be actually present. For instance, in the exemplary patent claim phraseology "a combustion air aperture extending through said thin-body flange, said combustion air aperture being located in said thin-body flange for alignment with the combustion air intake of the receiving carburetor for establishing fluid communication therebetween when said thin-body flange is abuttingly installed thereupon," the thin-body flange and the combustion air aperture are each recited claim limitations designated by the introductory word "said," while "the" receiving carburetor is not. Therefore, when interpreting this exemplary claim phrase, both the thin-body flange and the combustion air aperture, and their equivalents, are intended to be expressly required. The receiving carburetor, however, is not a requirement or limitation, but is instead recited for definition of the required element(s) that are described in relative terms thereto.

Referring now to FIG. 1, an inlet unit 1 for a two-stroke internal combustion engine is shown having an inlet duct, also referred to as the primary air duct 2. A conventional fuel supply duct to the carburetor would also be included in association therewith, but is not shown. Furthermore an additional air duct 3, located below the primary air duct 2 as shown, and which is utilized to provide additional air to the engine's cylinder.

The additional or scavenging air duct 3 can be closed at its inlet opening 4 by a valve assembly illustrated as a flapper-type valve, also called a flap valve, having a primary functional element that takes the form of the valve plate 5. The flap valve is pivotably or rotatably mounted by means of a turning shaft or axle 6, connected to an upper edge of the valve plate 5. The turning shaft 6 is journalled in supporting rings 7,8 embodied as integrated parts of a rear flange 14, where the flange 14 can also support an inlet muffler with an air-filter intended to provide cleaner air to the two air intakes. By this construction, the axle 6 is proximately positioned at the scavenging air aperture 4 for associating the valve plate 5 with the aperture 4. As shown in FIG. 1, the support ring receivers, also referred to as pivotal hinge receivers 7,8 may be characterized as being positioned adjacent to the scavenging air aperture 4, a relationship defined herein to constitute not only close proximate positioning, but also without other components positioned therebetween that can affect the cooperation of the valve element 5 with the scavenging air inlet 4.

The flange 14 is provided with a plurality of bolts or screws 16, of which two are shown. These fasteners join the flanges 14, 15 together; and in this manner, the carburetor 17 and the additional air duct 3 are held fixed, thus establishing the inlet unit 1. As depicted, both ducts 2,3 are connected at the front end to the cylinder(s) of the engine via the flange 15.

Figure 2:
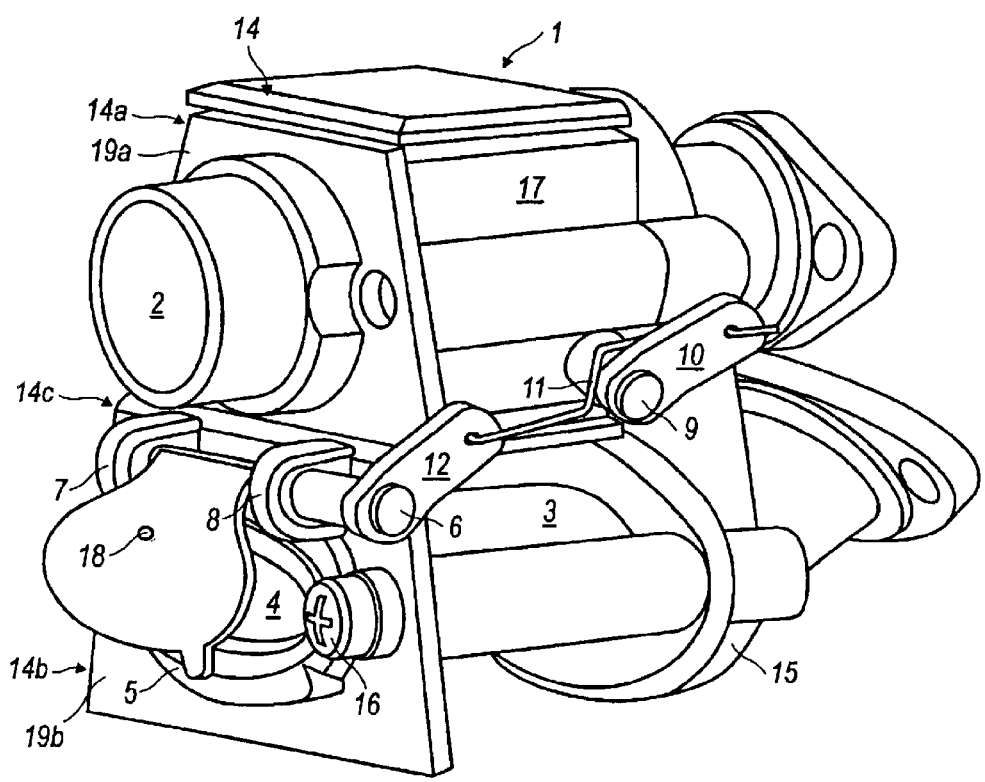
FIG. 2 is a perspective view of the inlet unit of FIG. 1, but with the additional air-regulating valve in an opened position.

As illustrated in FIGS. 1 and 2, the rear thin-body flange 14 serves to complete the assemblage of the inlet unit 1 and acts as a scavenging air transfer member 14. Together with the valve assembly provided at the scavenging air aperture 4, the thin-body flange 14 makes up a flange assembly for supporting a scavenging air supply to an internal combustion engine via the carburetor 17. As illustrated, the flange 14 is monolithically constructed and substantially flat in configuration with minor variations thereto. As shown, the flange 14 constitutes three primary sections: two offset planar portions 14a and 14b positioned and connected astride a transitional portion 14c. Though when taken in a general context, flange 14 is substantially flat, the upper portion 14a is offset slightly from the lower or second planar portion 14b. More specifically, because the lower portion 14b is of greater size than the upper portion 14a, the flange 14 can be described as being constructed so that a predominant portion thereof, that is greater than fifty percent,.forms a substantially flat plate. Further still, the outwardly directed surfaces of the two flange portions 19a, 19b are each substantially planar and parallel one to the other, even if not residing in the exact same plane.

The top portion 14a has an exposed exterior side surface 19a that is slightly offset from a similarly oriented exterior side surface 19b of the lower portion 14b. The transitional portion 14c takes the form of a bend or angle that affects the offset relative positioning of the two flange portions 14a, 14b. In FIG. 1, it is upon lower offset planar portion 14a that the support rings 7, 8 for the turning shaft 6 are mounted. Given that the flange 14 is substantially sheet-like in construction, the backside, or carburetor-side surface of the flange 14 is a substantial mirror image of the exposed exterior side surfaces 19a, 19b. This backside surface is substantially planar, much like the opposite exposed surfaces 19a, 19b, and configured for face-to-face engagements with an end surface of the carburetor when installed thereupon.

In the illustration of FIG. 1, it is through the upper offset planar portion 14a that the primary air duct 2, also referred to as the combustion air aperture, extends. Below, but parallel to the combustion air aperture 2, scavenging air aperture 4, also referred to as an inlet opening 4, extends through the lower planar portion 14b. Though described as apertures or openings 2, 4, these through passages also establish respective flow channels through the flange or transfer member 14. Because of this construction, the apertures 2, 4 can be characterized as being one above the other; more specifically, the combustion air aperture 2 is positioned above, and substantially over, the scavenging air aperture 4 in the illustrated embodiments of FIGS. 1–4.

Partly owing to the flange's 14 monolithic construction, and partly to its preferred construction from substantially rigid material, the flange 14 maintains those components that it connects or relates together at substantially fixed distances, one from the others. As a consequence, the features of these variously connected components, via the flange 14, are similarly fixed, one to the others, upon assemblage. In this way, not only are the apertures 2, 4 maintained a constant distance apart, but the flange's 14 connection to the carburetor 17 also serves to affect precision-location and maintenance of the scavenging air aperture at a predefined distance away from the carburetor 17.

As may also be appreciated in FIG. 1, when apertures are provided through the flange 14 that receive the same fasteners 16 utilized in the assembly of(the carburetor 17, relative precision placement of the related components is further facilitated. From a manufacturing perspective, at least a portion of these fastener receiving apertures that are provided in the flange 14 are strategically located to align with corresponding assembly screw receivers provided in the carburetor 17. Via such alignment and fixation, described relative locations and positions of the several related components and assemblies are precisely established due to the connection. It is also contemplated that offset fastener receivers may be utilized, but in this alternative embodiment, the carburetor 17 must be modified, typically with tapped holes suitable for receiving the head ends of the additional fastening bolts or screws that must be utilized to effect connection of the flange 14 to the carburetor 17.

In the illustrated embodiments of FIGS. 1–4, the flange 14 is joined to the carburetor 17 in abutting engagement therewith. The flange 14 exhibits the dimensions of length, width and thickness; the values of which descend in this same order. The apertures 2, 4 extend through the thin-body flange 14 and are oriented so that a long axis of each of those apertures is oriented substantially perpendicularly to a long axis of the flange 14.

Optionally, and as shown, the flange 14 can be configured to cover a substantial entirety of an end surface of the receiving carburetor 17 at which the inlet to the primary air duct 2 is located. Still further, it may be appreciated that the scavenging air inlet 4 is oblong in shape and oriented so that its long axis is substantially horizontally oriented.

At the forward or terminal end of the carburetor 17, the scavenging air flow is distributed via a manifold. Through utilization of the oblong scavenging aperture 14, the flow of additional air begins to be organized for optimized distribution through the manifold that will be located downstream therefrom.

In the primary air duct 2 of the inlet unit 1, a valve is provided for regulating the fuel gas supply and is configured to be pivoted around a transverse axis. In FIG. 1, this axis is illustrated as an axle having an exposed end 9 that extends outside the inlet unit 1. At this axle end 9, a first lever 10 is set at a predetermined angle in relation to the plane of the valve plate 5. By means of a link rod 11, the lever 10 is connected to a second lever 12 fixed to the turning shaft 6 of the additional or scavenging air duct's 3 valve plate 5. By choosing the length of this lever 12 to be shorter or longer than the first lever 10, the opening characteristic of the valve plate 5 can be determined; for example, whether the valve plate should open faster or slower than the throttle valve, and/or at different rates. The levers' 10, 12 mutual angles, and their angles in relation to the link rod will also influence this situation. The basic angles that are chosen at engine idle speed, as depicted in FIG. 1, are thus of great importance.

Still referring to FIG. 1, and taken from the perspective of looking left to right in the flow direction of both the scavenging air and fuel/air mixture through the inlet unit 1, the levers 10, 12 with linkage 11 are located on the right-hand side. From this perspective, the shaft 9 of the throttle valve will turn in a clockwise direction at throttling. As shown, the linkage 11 to the turning shaft 6 to which the valve plate 5 is connected will also turn in a clockwise direction. In this way, the valve plate 5 at the inlet opening 4 is turned out from its abutment against the additional air duct 3.

Preferably, a seal or buffering element made of a compliant material, such as heat and cold resistant polymer, is arranged at the inlet opening 4 as can be appreciated from FIG. 2. This sealing arrangement assures that leakage air will not be sucked into the additional air duct 3 along the periphery of the valve plate 5. In a preferred embodiment, the seal takes the form of a lip that extends perpendicularly towards the valve plate and circumferentially surrounds the inlet opening 4. In order to more completely prevent leakage or jump-draw when the engine is idling, the valve plate 5 can be provided with a spring device that exerts a biasing pressure on the valve plate 5 toward the receiving scavenging air inlet.

For certain engines it might be justified to use additional air even at idling to support proper scavenging. In any event, in order to enable more exact amounts of scavenging air to flow past and be controlled by the valve, a small air hole 18 can be optionally provided in the valve plate 5 that permits any vacuum created at the plate 5 to be more easily broken, and the valve opened and controlled with precision.

Adjusting screws are provided for controlling the supply of fuel and primary air that is used to make the fuel/air mixture supplied to the engine from the carburetor. The same adjustment screws can also be used to fine tune the carburetor to achieve optimized operation, particularly at idling speeds, considering the trace amount of additional air permitted through the small air hole 18 in the plate 5.

Figure 3:
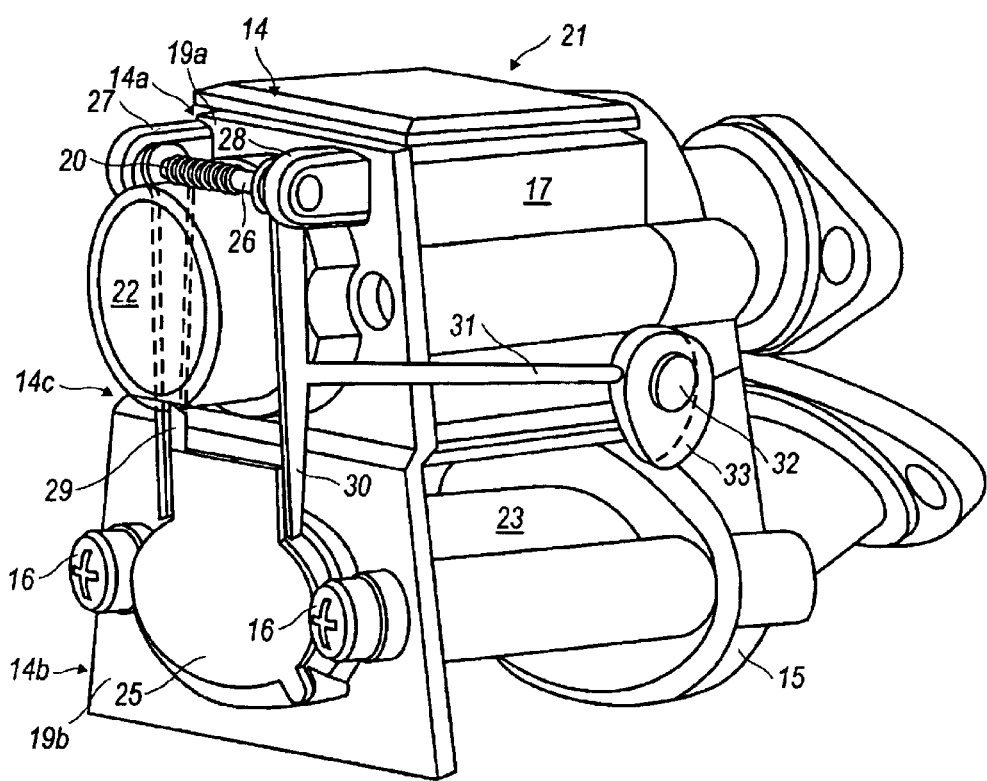
FIG. 3 is a perspective view of an alternative embodiment exhibiting the invention(s) and in which the additional air-regulating valve is in a closed position and has its supporting shaft located above the primary air duct where a supporting device is located astride the primary air duct supporting the valve plate.
Figure 4:
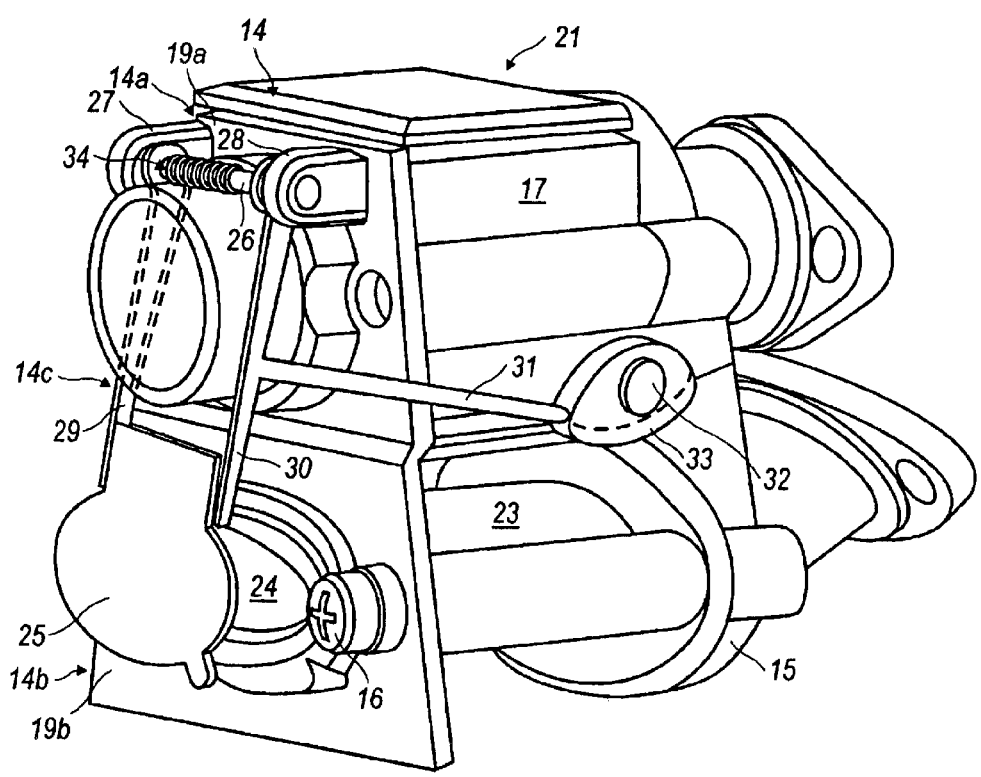
FIG. 4 is a perspective view of the inlet unit of FIG. 3, but with the additional air-regulating valve in an opened position.

To further improve the possibilities for regulating the flow of additional air passing by the valve plate into the additional air duct, another embodiment of an inlet unit 21 has been developed and is shown in the illustrations of FIGS. 3 and 4. In this embodiment, the inlet unit 21 with its primary air duct 22 and additional air duct 23 substantially corresponds to that which is illustrated in FIGS. 1 and 2. There are, however, differences in the suspension of the valve plate at the inlet of the additional air duct and in the transfer arrangement for the setting of the valve plate in relation to the setting position of the throttle valve.

The inlet unit 21 is arranged with the primary air duct 22, which internally has known devices for supply and vaporization of liquid fuel and for flow regulation of the air/fuel mixture. In parallel with the primary or combustion air duct 22 is the additional or scavenging air duct 23 for conveying additional or scavenging air into air ducts of the engine cylinder. In front of an inlet 24 of the additional air duct 23, a valve plate 25 is movably mounted. Preferably, the arrangement is movably supported by a fork-shaped device comprising a turning shaft 26 journalled in bearing rings 27, 28 integrated with the rear flange 14 and a pair of shanks 29, 30. The elongate arrangement includes two leveraging extensions or shanks 29, 30 in the form of the fork-shaped device. This pair of shanks 29, 30 can also be referred to as a plurality of leveraging extensions 29, 30 that are each coupled to the thin-body flange 14 at pivot hinges at a first end, and that are coupled to a flapper-type valve element 25 at an end opposite thereto. A torsion spring 20 is provided around the turning shaft 26 that urges the valve plate 25 toward the closed configuration.

A push rod 31 is connected to a second shank 30 of the fork-shaped device that in FIGS. 3 and 4 is shown to operate as a unit with first shank 29. The push rod 31 can be pivotably connected to the shank 30, or, in case of a movable connection between the fork-shaped device and the valve plate 25, can be connected at such a point that the valve plate 25 will always lift from its pivot seat at the inlet 24 of the additional air duct 23 parallel with the seat.

The free end of the push rod 31 fits against camshaft pulley 33 that is centrically or eccentrically firmly attached to axel end 32 extending from the inlet unit 21 on the turning shaft of the carburetor's throttle valve. At each setting of the throttle valve, for example at throttled operation, the position of the cam lobe or camshaft pulley 33 will change in accordance with the turning of the shaft supporting the throttle valve. In this way, a proportioning of additional air for the desired engine speed at each point in time is achieved.

The arrangement of having a cam-controlled opening of the valve plate 25 provides many possibilities due to the shape and eccentricity of the camshaft pulley 33 to control the degree of opening, as well as the rate at which changes are affected between different degrees of being open. By way of this configuration, if desirable for a particular engine, the valve plate 25 can be widely opened at initial throttling, and then be throttled back or closed at higher engine speeds, and vice versa. A very wide range of valve operation and timing may be affected using this cam-driven arrangement for the scavenging air valve assembly.

Since the valve plate 25 in this embodiment has its pivotal point at the turning shaft 26 located relatively far away from the center of the inlet 24 on an opposite side of the primary air duct 22 from the air inlet 24, the valve plate 25 will always move practically in parallel with the seat of the valve plate. This is due to the relatively long pivot arm for the valve member 25 established using the extending fork-shaped device. No matter whether this includes the above-mentioned seal made of a compliant material or if the valve plate 25 is ground into its seat for close sealing, the air flow into the additional air duct will still take place practically free from turbulence. This is of great importance considering the small dimensions that are prevailing for the smallest engines upon which this aspect of the invention(s) may be utilized.

Due to the inclusion of the biasing spring 20, the valve plate 25 is maintained in the closed position until forcibly moved therefrom. When the valve plate 25 is opened, the spring 20 is tightened to a heightened tension configuration 34 that urges the valve 25 back toward the closed configuration against an end surface of the additional air duct 23. The closing action will not necessarily be perpendicular towards the duct, but can be oblique so that the opening angle of the valve plate, from being completely closed to being fully opened, can be varied. This feature can serve a similar function to the small air hole 18 provided through the valve plate 5 of FIG. 1 for facilitating precision-control of the valve's 15 opening and closing action.

Figure 5:
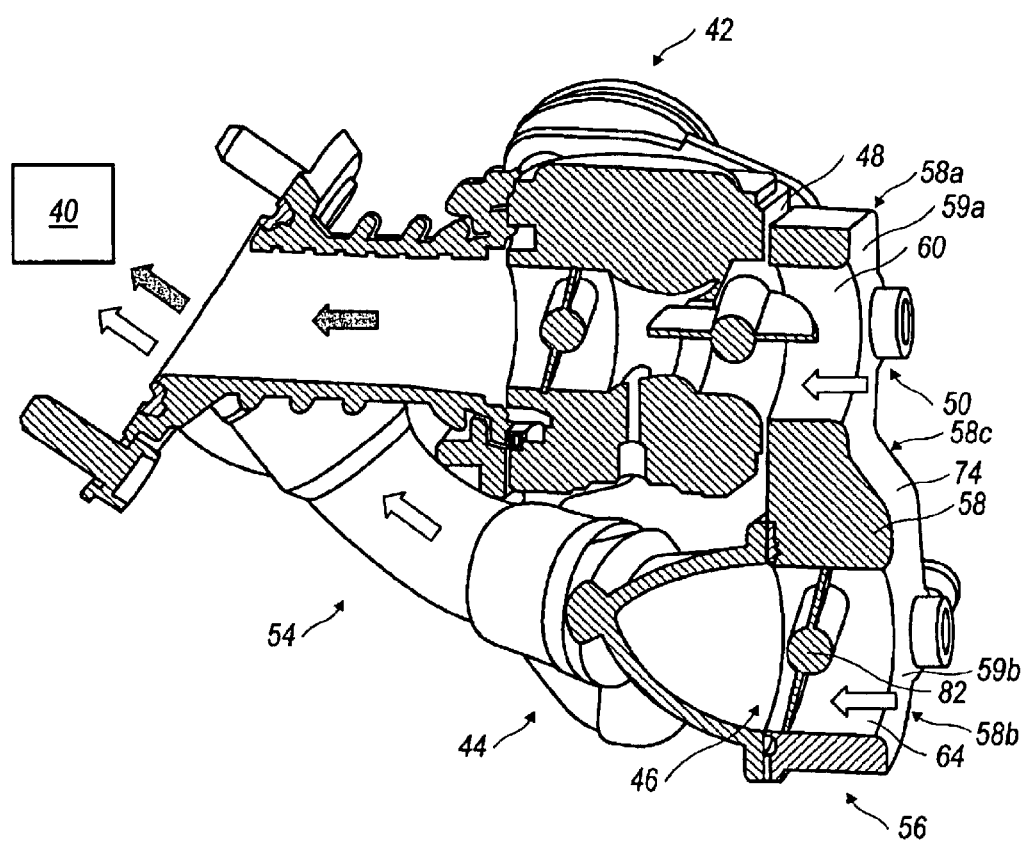
FIG. 5 is a perspective view, shown in partial cross-section, of an alternative embodiment of the scavenging air transfer member which is a primary object of the present invention(s) and which is mounted on a carburetor assembly.

Alternative embodiments of the invention(s) are disclosed in FIGS. 5–15. Many of the components and features shown in these drawings are common to the embodiments depicted in FIGS. 1–4. While not shown in FIGS. 1–4, FIG. 5 schematically illustrates a two-stroke internal combustion engine 40 that is provided a fuel/air mixture, the flow of which is depicted by shaded arrows, and a scavenging air supply, the flow of which is shown via a series of unshaded arrows in the lower duct. A simplified depiction of a carburetor arrangement, referred to as a receiving carburetor 42, is shown in FIG. 5 as being functionally associated with the engine 40 for providing the requisite fuel/air supply thereto. A flange assembly 56, including a thin-body flange 58 which corresponds to the earlier described rear flange 14, is shown mounted on an end surface 48 of the carburetor 42. It should be appreciated that the flange 14 may also be positioned at the opposite and downstream end surface of the carburetor 42.

Like the thin-body flange 14 of FIGS. 1–4, the flange 58 is exemplarily shown as having two offset planar portions 58a, 58b connected one to the other by a transitional portion 58c. The two offset planar portions 58a, 58b each have an exposed side surface 59a, 59b, respectively. In this embodiment, it is these two side surfaces 59a, 59b of the flange 58 that are offset one from the other. This is caused by the different thicknesses associated with the offset planar portions 58a, 58b.

A combustion air aperture 60 is located in an upper portion of the flange 58 and a scavenging air aperture 64 is located in a lower portion of the flange 58. As with respect to the earlier described embodiments, the manufacture of the flange 58 is from substantially rigid and non-flexible material which enables precision-location of the scavenging air aperture 64 relative to the balance of the receiving carburetor 42 when connected thereupon. As shown, fresh air is supplied to a combustion air intake 50 of the carburetor 42 via the combustion air aperture 60. Fresh air is supplied to the scavenging air supply 54 via the scavenging air aperture 64. As described before, the flange 58 can be adapted to accept a filter for decontaminating incoming air prior to introduction into the downstream carburetor and engine assemblies.

The scavenging air aperture 64 serves as an intake port to the scavenging air supply arrangement 54. From the aperture 64, inlet air is conveyed to an inlet portion 46 to a multi-branch manifold 44 where the single air flow through the aperture 64 is divided into a plurality of branches, each directed to a port at the cylinder of the engine 40.

Figure 6:
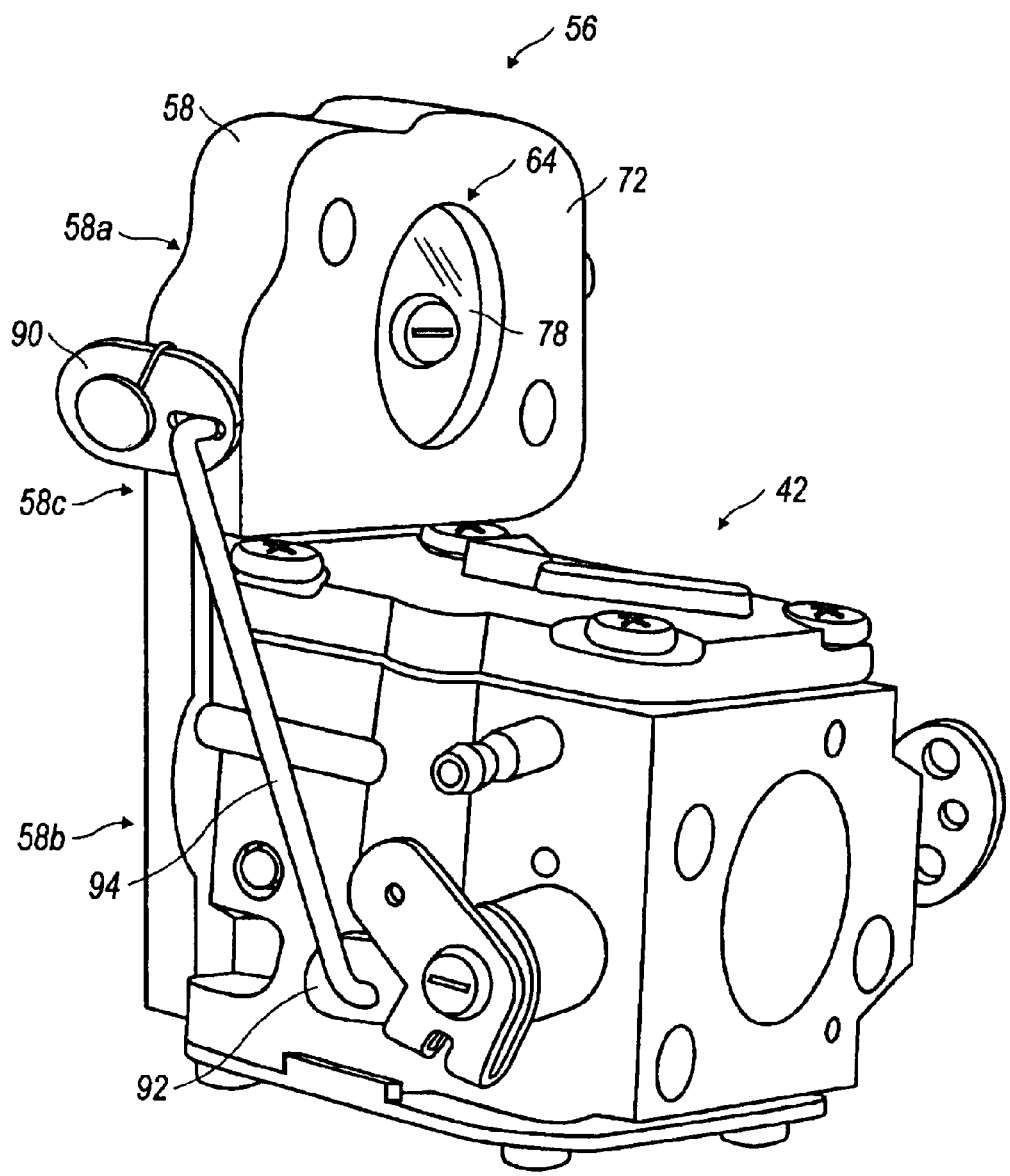
FIG. 6 is a perspective view of another alternative embodiment of the present invention showing a scavenging air transfer member in the form of a thin-body flange mounted upon the intake side of a carburetor.
Figure 7:
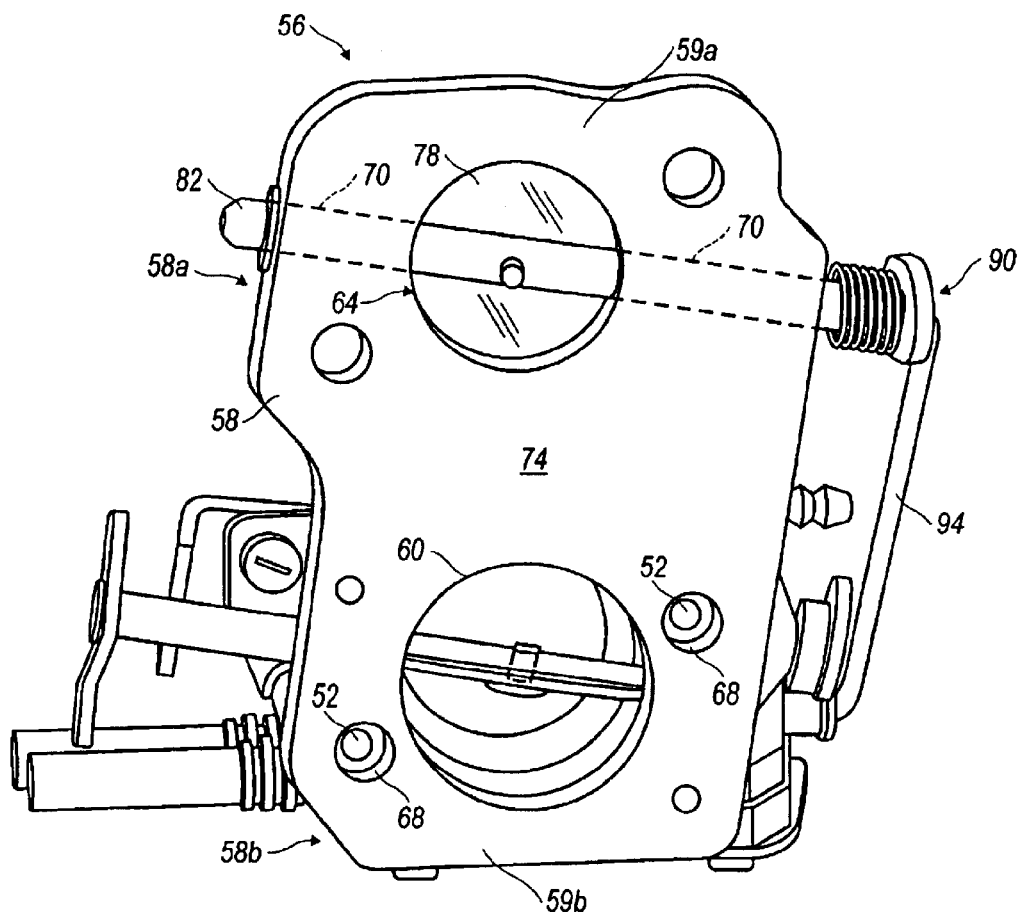
FIG. 7 is an end perspective view of the arrangement shown in FIG. 6.

Turning to FIGS. 6 and 7, still another embodiment of the invention(s) is depicted. Once again, the flange assembly 56 is shown mounted upon a receiving carburetor 42. The assembly 56 includes a thin-body flange 58 made up of the several portions 58a, 58b and 58c. A different characteristic of this embodiment, however, is that back or carburetor-side surfaces 72 of the flange 58 are offset one from the other, as opposed to the outwardly directed, exposed and offset surface 74. Another basic difference is that the scavenging air supply assembly 54 is above the carburetor 42, as opposed to below, as depicted in FIG. 5. And again, it should be appreciated that the flange 58 may also be positioned on the downstream end of the carburetor 42; and depending upon environmental conditions and connective requirements, the flange may be variously oriented on the carburetor 42 at that end. It is further contemplated that an adaptor such as the flange 58 may even be mounted on a lateral side, or a top or a bottom surface of the carburetor 42. This capability for variously mounting the flange 58 in association with the carburetor 42 enhances its utility as a connective adaptor, especially when it is considered that the simplistic construction of the flange 58 is easily changed to further facilitate environmental demands.

An alternative arrangement is depicted in FIGS. 6–7 for the control linkage 94 for interconnection between the fuel inlet valve and the scavenging air inlet valve 78. As demonstrated in these FIGS. 6–7, a lever 90 operatively associated with the scavenging valve assembly 76 is interconnected via the linkage 94 to a lever 92 operatively associated with the fuel valve. A biasing member in the form of a spring is provided adjacent to the scavenging valve lever 90 for urging the scavenging valve assembly 76 toward a particular configuration, which is typically the closed position.

A slot is provided in the scavenging valve lever 90 within which the lever linkage 94 is engaged. The elongate design of the slot effectively provides a lost motion connection that enables a certain range of motion at the fuel valve lever 92 that affects no motion at the scavenging valve lever 90. As will be explained in greater detail hereinbelow, this feature enables potentiated operation at lower-end speeds, including idle speed.

FIG. 7 further indicates that the valve assembly 76 provided to control the scavenging air supply 54 includes a butterfly-style valve with a valve element 78 mounted on a rotatable axle 82. End portions of the axle 82 are received in axle apertures 70 formed in the thin-body flange 58 adjacent to the scavenging air aperture 64. When the scavenging air aperture 64 is considered to be a channel or passage, the axle apertures 70 can be considered to be formed at the side walls thereof, and extending into the body of the flange 58.

Fastener accommodating apertures 68 are provided through the thin-body flange 58 in a region adjacent the carburetor 42 when mounted thereupon. Preferably, these apertures 68 are positioned to be aligned with assembly screw receivers 52 in the carburetor. In this way, no accommodating adaptations are required to the carburetor 42 for accepting the adapter 58. As explained above, this is an important aspect of this adaptive arrangement of the presently disclosed invention(s) because it enables substantial cost savings, as well as time economies associated with the development and production of new scavenged two-stroke internal combustion engine designs.

Figure 8:
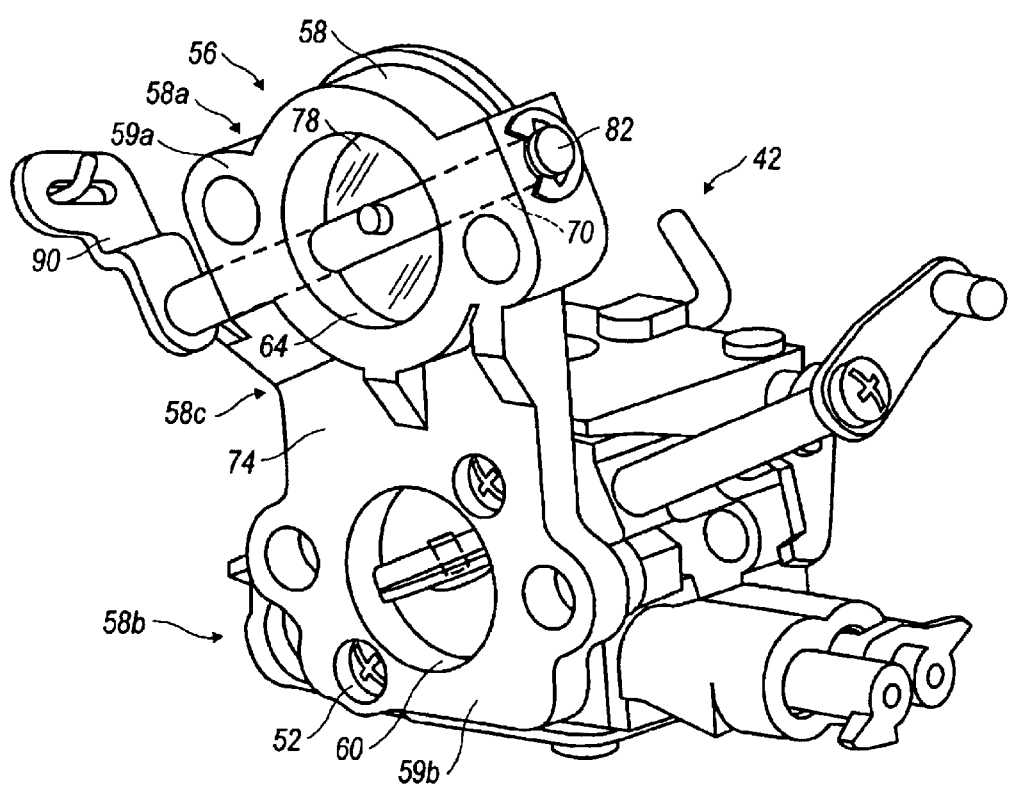
FIG. 8 is a perspective view similar to FIG. 6, but of an alternatively configured scavenging air transfer member, also in the form of a thin-body flange, mounted upon a differently arranged carburetor.
Figure 9:
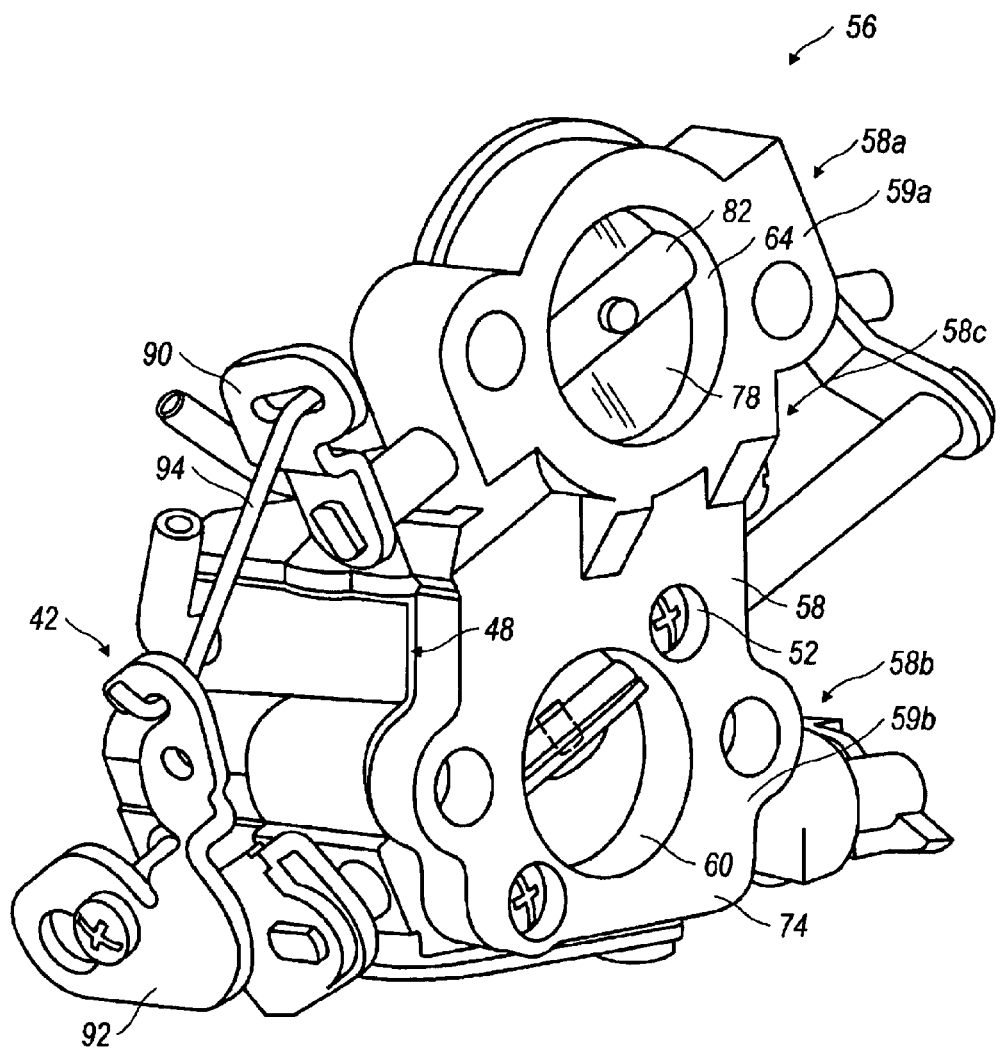
FIG. 9 is a perspective view of the arrangement of FIG. 8, but taken from a different angle.

FIGS. 8–9 show yet another alternative embodiment of the present invention(s). In this configuration, the exposed side surfaces 59a, 59b of the thin-body flange 58 are offset one from the other, while the surface directed toward the carburetor 42 is depicted as being planar. The transitional portion 58c is also affected differently. Effectively, ribbed members are utilized in the mid-region of the flange 58 to accommodate the reduction in thickness from the upper portion 58a of the flange body 58 to the thinner lower portion 58b thereof.

FIG. 9 shows a different perspective of the assembly of FIG. 8 depicting an alternative inter-linkage assembly that is provided between the levers 90, 92. As described above, a lost motion feature is again provided via the slot shown in lever 90.

Figure 10A:
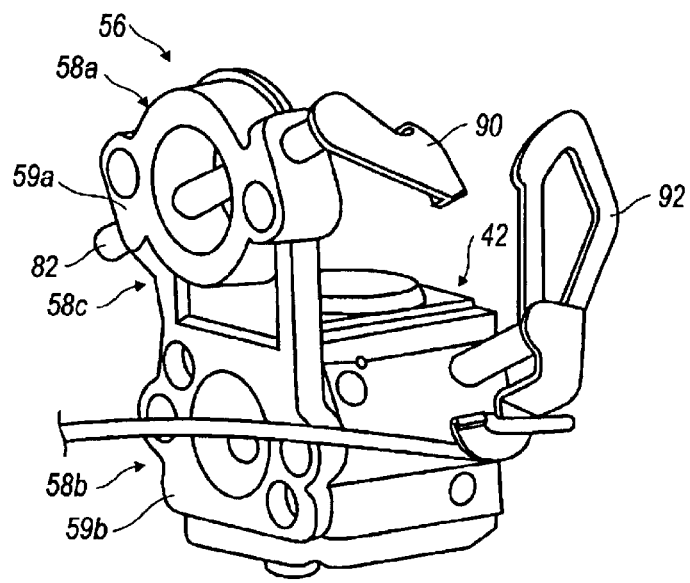
FIG. 10A is a perspective view of yet another alternative embodiment of the scavenging air transfer member mounted on a carburetor depicting the lost-motion linkage rotatably mounted on the carburetor which actuates the valve associated with the scavenging air transfer channel.
Figure 10B:
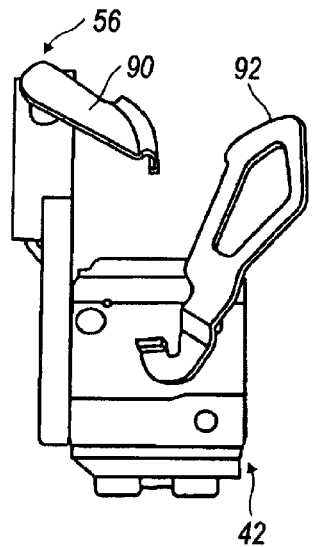
FIGS. 10B 10C provide a series of elevational side views of the arrangement of FIG. 10A moving from an unactuated configuration of the scavenging air valve (10B), to a start-actuation configuration (10C), to a substantially fully actuated configuration of the scavenging air control valve (10D)
Figure 10C:
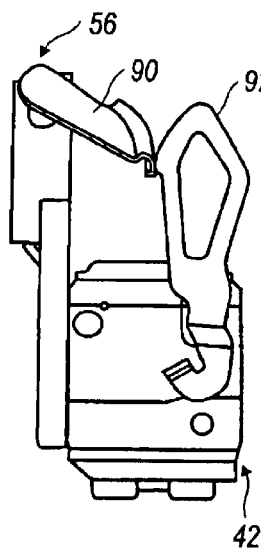
Figure 10D:
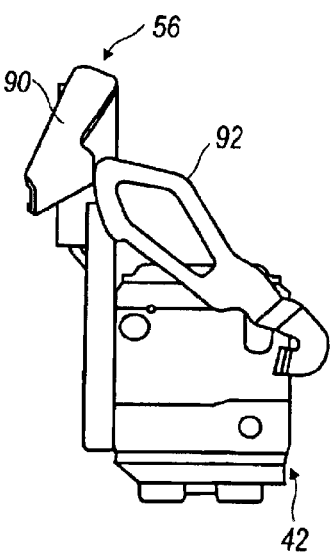

FIG. 10A illustrates an alternative inter-linkage between the fuel valve lever 92 and the scavenging air valve lever 90. The fuel valve lever 92 is provided with an extended portion that is not interconnected with the lever 90 of the scavenging valve, but instead is configured to come into abutting engagement therewith. In this manner, a lost motion function is established across this distance before engagement is achieved between the two levers 90, 92. FIG. 10B shows a configuration in which the engine 40 is running substantially at idle speed. Here, the scavenging air valve assembly 76 is essentially closed thereby avoiding the introduction of additional air to the engine 40. FIG. 10C shows the engine running slightly faster, but still in a sufficiently low speed range that it is desired to still maintain the scavenging valve in closed configuration. FIG. 10D illustrates a configuration in which the scavenging valve assembly 76 is actuated toward an open configuration thereby supplying scavenging air to the engine 40. As may be appreciated from the irregular top surface of the lever 92, different perimeter surface-shapes can be provided for affecting varying operation of the scavenging valve lever 90. This can be likened to the easily varied cam surfaces 33 of the actuation assembly of the FIGS. 3–4.

Figure 11:
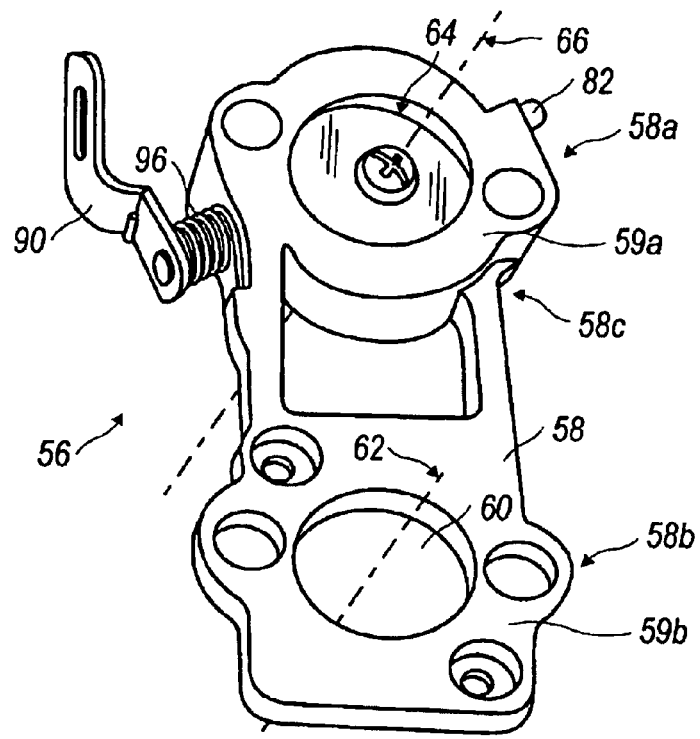
FIG. 11 is a perspective view taken from one side of an alternative embodiment of the scavenging air transfer member configured as a thin-body flange.
Figure 12:
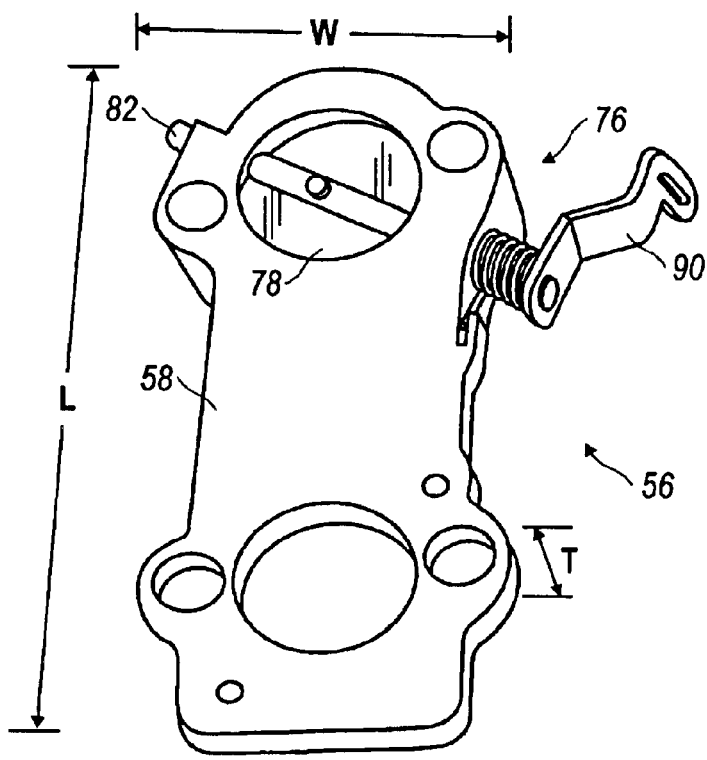
FIG. 12 is a perspective view of the flange shown in FIG. 11, looking toward the opposite side thereof.

More detailed exemplary illustrations of the flange assembly 56 are provided in FIGS. 11–12. The several different portions 58a, 58b and 58c and side surfaces 59a, 59b of the thin-body flange 58 are shown. The scavenging air control valve assembly 76, including the axle 82 and a valve element 78, as well as the lever 90 and biasing spring 96, are shown as constituent components of the flange assembly 56. A longitudinal axis 62 of the combustion air aperture 60 is defined in FIG. 11, as is a longitudinal axis 66 of the scavenging air aperture 64. In FIG. 12, the dimensions of length (L), width (W) and thickness (T) are designated.

Figure 13:
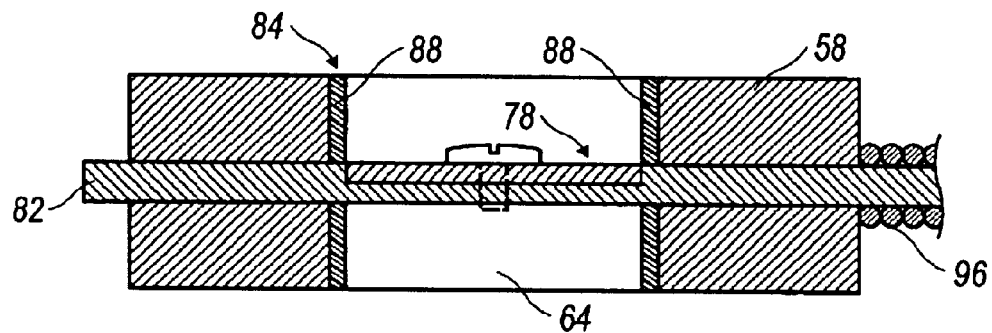
FIG. 13 is a cross-sectional schematic view showing an axle-mounted scavenging air control valve mounted in a scavenging air transfer member in which a liner is constructed from buffering material and is shown as an insert in the body of the transfer member.
Figure 14:
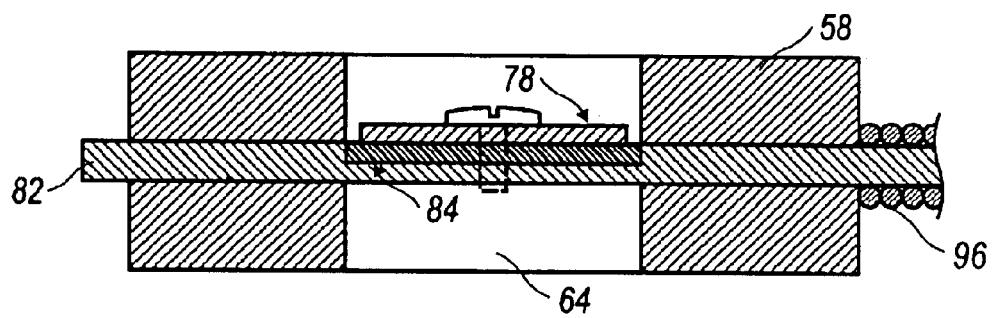
FIG. 14 is a cross-sectional schematic view of a valve element constructed from buffering or softer material than that from which the main body of the flange adapter is constructed.
Figure 15:
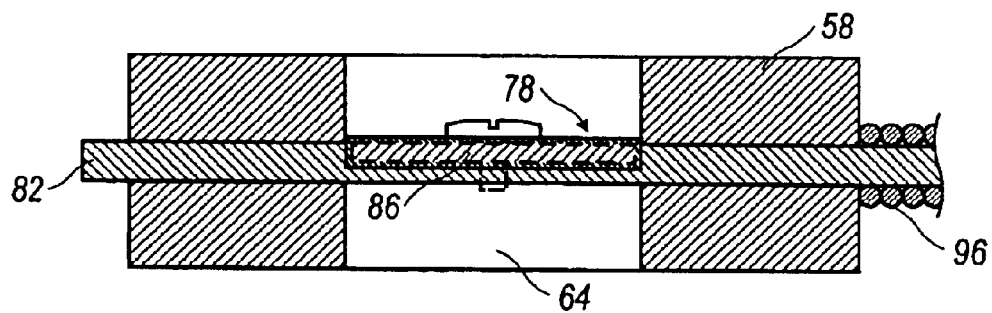
FIG. 15 is a cross-sectional schematic view of a valve element encased within, or at least provided with a perimeter-surrounding lip of softer buffering material intended to complete a seal between the valve element and the flange body with the element cooperates for affecting a sealed blockage of the scavenging air flow.

FIGS. 13–15 illustrate three exemplary variations in which a buffering component 84 is incorporated in association with the scavenging air valve assembly 76. As described hereinabove, one aspect of the present invention(s) is the inclusion of a buffering component manufactured from a material softer than that of either one or both of the valve element 78 and that portion of the flange 58 that form the seat therefor. In some respects, commonalities are found between these specially configured buffering elements 84 and the seal arrangement described with respect to FIG. 2. In FIG. 13, the buffering component 84 takes the form of a liner 88 positioned at the valve element receiving surface in the scavenging air aperture 64. The liner 88 can reside above the surface of the passage through the flange 58 established by the scavenging air aperture 64, or it may be recessed into the body of the flange 58 so as not to cause an obstruction in that passageway. As an alternative, the buffering component 84 is shown as a disk-type member in FIG. 14 that is connected to the valve element 78. The diameter of the buffering component 84 is slightly greater than that of the valve element or backup disk and it is therefore a perimeter of this softer buffering component 84 that engages the side walls of the scavenging air aperture are passage 64. Still further, FIG. 15 illustrates an embodiment of the buffering component in which a lip 86 is established around a perimeter of the valve element 78. By this construction, the lip 86 performs similarly to the periphery of the disk 84 of FIG. 14 when abuttingly engaged in the closed configuration with the flange 58.

It will be apparent to those persons skilled in the relevant art, after studying the present disclosure, that a number of various embodiments can be developed within the scope of the following patent claims, the same exclusively establishing the scope of protection for the invention claimed herein.

What is claimed is:

1. A flange assembly for supporting a scavenging air supply to an internal combustion engine at a carburetor associated with the engine, said flange assembly comprising:

a thin-body flange configured to be abuttingly installed upon an end surface of a receiving carburetor in which a combustion air intake is located;

a combustion air aperture extending through said thin-body flange, said combustion air aperture being located in said thin-body flange for alignment with the combustion air intake of the receiving carburetor for establishing fluid communication therebetween when said thin-body flange is abuttingly installed thereupon;

a scavenging air aperture extending through said thin-body flange, said scavenging air aperture being located in said thin-body flange and spaced apart from said combustion air aperture; and a valve assembly operatively coupled to said thin-body flange and having a valve element positioned at said scavenging air aperture for opening and closing said scavenging air aperture.

2. The flange assembly as recited in claim 1, wherein said thin-body flange is of one-piece, predominantly flat and rigid construction thereby affecting precision-location of said scavenging air aperture relative to said combustion air aperture and also facilitating precision-placement of said scavenging air aperture with respect to the receiving carburetor when said thin-body flange is installed thereupon.

3. The flange assembly as recited in claim 1, further comprising:

fastener accommodating apertures extending through said thin-body flange and located to align with assembly screw receivers in the receiving carburetor when said thin-body flange is installed thereupon thereby facilitating precision-placement of said scavenging air aperture with respect to the receiving carburetor when said thin-body flange is installed thereupon.

4. The flange assembly as recited in claim 1, further comprising:

fastener accommodating apertures extending through said thin-body flange and located to be offset from assembly screw receivers in the receiving carburetor when said thin-body flange is installed thereupon.

5. The flange assembly as recited in claim 1, further comprising:

said scavenging air aperture being oblong in shape through said thin-body flange for establishing an inlet to a multi-branch manifold when said flange assembly is installed on a receiving carburetor and included on an internal combustion engine.

6. A flange assembly for supporting a scavenging air supply to an internal combustion engine at a carburetor associated with the engine, said flange assembly comprising:

a thin-body flange configured to be abuttingly installed upon an end surface of a receiving carburetor in which a combustion air intake is located, said thin-body flange having thickness, length and width dimensions;

a combustion air aperture and a scavenging air aperture each extending through said thin-body flange and across said thickness dimension and spaced apart, one aperture from the other; and a valve assembly operatively coupled to said thin-body flange and having a valve element positioned at said scavenging air aperture for opening and closing said scavenging air aperture.

7. The flange assembly as recited in claim 6, further comprising:

said length and said width dimensions of said thin-body flange are greater than said thickness dimension; and said combustion air aperture and said scavenging air aperture each has a longitudinal axis extending substantially perpendicular to a longitudinal axis of said thin-body flange.

8. The flange assembly as recited in claim 6, further comprising:

an axle of said valve assembly being positioned at said scavenging air aperture on said thin-body flange for associating a valve element with said scavenging air aperture.

9. The flange assembly as recited in claim 6, wherein said thin-body flange is configured to substantially cover an end surface of the receiving carburetor when said thin-body flange is installed thereupon.

10. The flange assembly as recited in claim 6, further comprising:

an axle for a valve element of a butterfly valve, said axle extending across said scavenging air aperture and being rotatably supported in axle apertures in said thin-body flange.

11. The flange assembly as recited in claim 6, further comprising:

a pivot hinge receiver, said pivot hinge receiver positioned adjacent to said scavenging air aperture on said thin-body flange for associating a flapper-type valve element with said scavenging air aperture.

12. The flange assembly as recited in claim 6, wherein among the dimensions of said thin-body flange, said length dimension is greater than said width dimension, and said width dimension is greater than said thickness dimension.

13. The flange assembly as recited in claim 6, further comprising:

said valve element being rotatably coupled to said thin-body flange and being constructed at least partially from a buffering material that is softer than the construction material of said thin-body flange thereby facilitating a seal between said valve element and said thin-body flange when said valve element is positioned in a closed configuration.

14. The flange assembly as recited in claim 6, further comprising:

said valve element being rotatably coupled to said thin-body flange; and a buffering component positioned between said valve element and said thin-body flange in a closed configuration of said valve element, said buffering component constructed from material softer than material used in construction of said valve element thereby facilitating a seal between said valve element and said thin-body flange when said valve element is positioned in the closed configuration.

15. The flange assembly as recited in claim 14, wherein said buffering component is a lip formed substantially about a perimeter of said valve element.

16. The flange assembly as recited in claim 14, wherein said buffering component is a liner positioned at least partially within said thin-body flange and having a surface portion exposed to said valve element for engagement therewith in said closed configuration.

17. The flange assembly as recited in claim 6, further comprising;

at least one pivot hinge receiver, a leveraging extension and a flapper-type valve element, said pivot hinge receiver positioned on said thin-body flange remotely away from said scavenging air aperture at least as far away as said combustion air aperture, and together with said leveraging extension, positioning said flapper-type valve element to open and close said scavenging air aperture.

18. The flange assembly as recited in claim 17, wherein said at least one pivot hinge receiver includes a plurality of pivot hinge receivers, each of said plurality of pivot hinge receivers being positioned on said thin-body flange on an opposite side of said combustion air aperture away from said scavenging air aperture for associating a flapper-type valve element supported on a leveraging extension with said scavenging air aperture.

19. The flange assembly as recited in claim 18, further comprising:
   a plurality of leveraging extensions, each leveraging extension being coupled to said thin-body flange by a respective pivot hinge; and
   said flapper-type valve element being attached to each leveraging extension at a remote position from a respective pivot hinge.

20. The flange assembly as recited in claim 6, wherein said scavenging air aperture and said combustion air aperture are positioned one above the other when said thin-body flange is abuttingly installed upon the receiving carburetor.

21. The flange assembly as recited in claim 20, wherein said scavenging air aperture is positioned above said combustion air aperture when said thin-body flange is abuttingly installed upon the receiving carburetor.

22. The flange assembly as recited in claim 20, wherein said scavenging air aperture is positioned below said combustion air aperture when said thin-body flange is abuttingly installed upon the receiving carburetor.

23. The flange assembly as recited in claim 6, wherein said thin-body flange is constructed so that a predominant portion thereof forms a substantially flat plate.

24. The flange assembly as recited in claim 23, wherein a carburetor-side surface of said thin-body flange is substantially planar for accommodating face-to-face engagement with the end surface of the receiving carburetor when said thin-body flange is installed thereupon.

25. The flange assembly as recited in claim 24, wherein an outwardly directed surface of said thin-body flange opposite to said carburetor-side surface of said thin-body flange is substantially planar and parallel to said carburetor-side surface of said thin-body flange.

26. The flange assembly as recited in claim 24, wherein a predominant portion of an outwardly directed surface of said thin-body flange is substantially planar and parallel in orientation to said carburetor-side surface of said thin-body flange.

27. A flange assembly for supporting a scavenging air supply to an internal combustion engine at a carburetor associated with the engine, said flange assembly comprising:
   a thin-body flange configured to be installed upon a receiving carburetor designed to be associated with an internal combustion engine;
   a scavenging air aperture extending through said thin-body flange, said scavenging air aperture being located in said thin-body flange so that said scavenging air aperture is spaced at a distance from the receiving carburetor; and
   a valve assembly operatively coupled to said thin-body flange and having a valve element positioned at said scavenging air aperture for opening and closing said scavenging air aperture.

28. The flange assembly as recited in claim 27, wherein said thin-body flange is of one-piece, predominantly flat and rigid construction thereby affecting precision-location of said scavenging air aperture relative to the receiving carburetor when said thin-body flange is installed thereupon.

29. The flange assembly as recited in claim 27, further comprising:
   said thin-body flange being of one-piece construction and comprising two offset planar portions connected by a transitional portion, each of said two planar portions having exposed side surfaces on the same side of said thin-body flange; and
   said two exposed side surfaces of said two planar portions being substantially parallel, one to the other, and offset, one from the other in different planes.

30. The flange assembly as recited in claim 27, further comprising:
   fastener accommodating apertures extending through said thin-body flange and located to align with assembly screw receivers in the receiving carburetor when said thin-body flange is installed thereupon thereby facilitating precision-placement of said scavenging air aperture with respect to the receiving carburetor when said thin-body flange is installed thereupon.

31. The flange assembly as recited in claim 30, wherein said thin-body flange is of one-piece, predominantly flat and rigid construction thereby affecting precision-location of said scavenging air aperture relative to said fastener accommodating apertures extending through said thin-body flange.

32. The flange assembly as recited in claim 27, further comprising:
   said scavenging air aperture being oblong in shape through said thin-body flange for establishing an inlet to a multi-branch manifold when said flange assembly is installed on a receiving carburetor and included on an internal combustion engine.

33. The flange assembly as recited in claim 27, further comprising:
   said thin-body flange having a thickness, a length and a width;
   said length and said width of said thin-body flange being greater than said thickness; and
   said scavenging air aperture extending through said thin-body flange and across said thickness thereof in a direction substantially perpendicular to a longitudinal axis of said thin-body flange thereby causing air flow through said scavenging air aperture to be substantially parallel with air flow through a combustion air channel of the receiving carburetor.

34. The flange assembly as recited in claim 33, further comprising:
   an axle of said valve assembly being positioned at said scavenging air aperture on said thin-body flange for associating a valve element with said scavenging air aperture.

35. The flange assembly as recited in claim 33, further comprising:
   an axle for a valve element of a butterfly valve, said axel extending across said scavenging air aperture and being rotatably supported in axle apertures in said thin-body flange.

36. The flange assembly as recited in claim 33, further comprising:
   a pivot hinge receiver, said pivot hinge receiver positioned adjacent to said scavenging air aperture on said thin-body flange for associating a flapper-type valve element with said scavenging air aperture.

37. The flange assembly as recited in claim 33, wherein among the dimensions of said thin-body flange, said length dimension is greater than said width dimension, and said width dimension is greater than said thickness dimension.

38. The flange assembly as recited in claim 33, further comprising:
   said valve element being rotatably coupled to said thin-body flange and being constructed at least partially from a buffering material that is softer than the construction material of said thin-body flange thereby facilitating a seal between said valve element and said thin-body flange when said valve element is positioned in a closed configuration.

39. The flange assembly as recited in claim 33, further comprising:
   said valve element being rotatably coupled to said thin-body flange; and
   a buffering component positioned between said valve element and said thin-body flange in a closed configuration of said valve element, said buffering component constructed from material softer than material used in construction of said valve element thereby facilitating a seal between said valve element and said thin-body flange when said valve element is positioned in the closed configuration.

* * * * *